Oct. 17, 1967 G B. JENNINGS 3,348,144
SYSTEM FOR MEASURING SPEEDS OF WORKPIECES ROTATED BY MOTOR
Filed Jan. 27, 1965
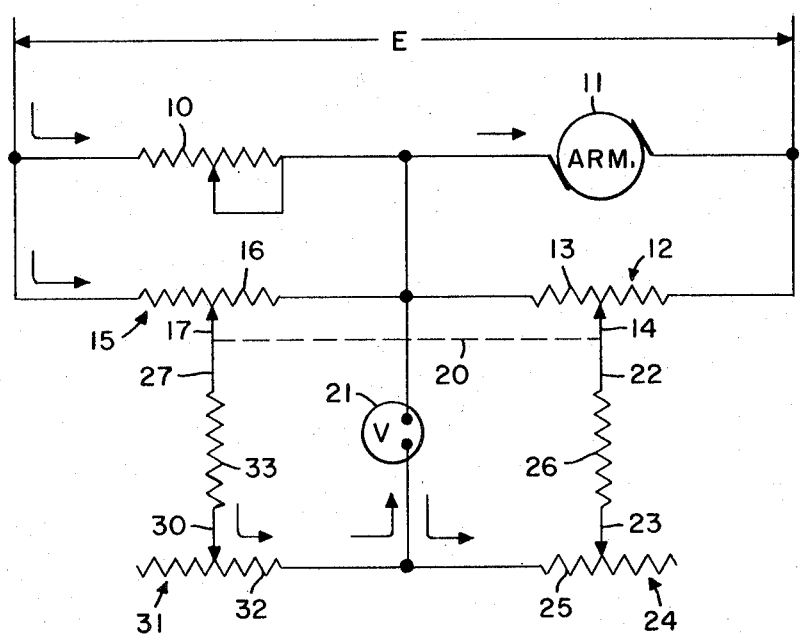
INVENTOR
G B. JENNINGS
BY
Cohn and Powell
ATTORNEYS United States Patent Office 3,348,144
Patented Oct. 17, 1967

3,348,144
SYSTEM FOR MEASURING SPEEDS OF WORK-
PIECES ROTATED BY MOTOR
G B. Jennings, Shrewsbury, Mo., assignor to The
Pandjiris Weldment Co., St. Louis, Mo., a corporation
of Missouri
Filed Jan. 27, 1965, Ser. No. 428,342
5 Claims. (Cl. 324—70)

ABSTRACT OF THE DISCLOSURE

A system for measuring the peripheral speeds of workpieces having different diameters rotated at variable speeds by a motor having an armature subject to a variable voltage to control the armature speed, the peripheral speeds being read directly on a voltmeter in inches per minute. One voltage divider is connected in parallel with the armature, while a second voltage divider is connected in parallel with a variable resistance connected in series with the armature. One terminal of the voltmeter is connected to the resistance elements and the other terminal is connected to the sliders, of the voltage dividers. Variable resistances are connected between the sliders and the voltmeter for accurate calibration.

This invention relates generally to improvements in a speed measuring system, and more particularly to a system for measuring the peripheral speed of workpieces having different diameters rotated at variable speeds by a rotary machine.

In certain types of work positioners, a workpiece is attached to a turntable capable of being tilted to a suitable angle, and the turntable, together with the workpiece, is rotated at a predetermined speed upon the performance of a welding operation about the periphery of the workpiece. Positioners of this general type are disclosed in U.S. Patents Nos. 2,318,791, 2,477,160, 2,835,964 and 3,039,766 among others.

Conventional systems for measuring speed of rotary machines employ a tachometer generator and an electric meter. The generator is mechanically connected to the motor shaft, the speed of which is to be measured, so that the generator rotates at the output speed or some fixed ratio thereto. The generator voltage, which is proportional to its speed, is read on the meter, which may be calibrated in r.p.m. This types of system is expensive both in initial cost and installation because of the requirement of a tachometer generator.

An important objective is achieved in machines driven by shunt wound D.C. motors by the provision of a measuring system that eliminates the tachometer generator and uses the armature of the drive motor of the rotary machine in its electrical circuit.

An important objective is realized by a system that measures the peripheral speeds of workpieces having different diameters rotated at variable speeds by a motor having an armature subject to a variable voltage to control the armature speed.

Yet another important object is afforded by a system which includes means responsive to the voltage applied to the armature providing a first voltage proportional to the workpiece diameter, means providing a second voltage proportional to the workpiece diameter and compensating for the difference between the voltage applied to the armature circuit and the voltage drop of the armature circuit, and indicating means responsive to the first and second voltages for reading the speed at the workpiece diameter, the indicating means being preferably calibrated in i.p.m. (inches per minute).

An important object is attained by a first potentiometer connectable across the armature and providing a voltage proportioned to the workpiece diameter to which the indicating means is responsive, by a second potentiometer providing a compensating voltage to the indicating means that is also proportional to the workpiece diameter, and by means operatively interconnecting the first and second potentiometers so that both potentiometers will provide voltages at all times proportional to the same workpiece diameter.

More specifically, it is advantageous that the potentiometers be interconnected in tandem with their shafts coupled so as to travel together and provide voltages to the indicating means which are proportional to the same workpiece diameter.

Another important objective is achieved by placing a compensating rheostat across the above identified said second potentiometer that supplies a voltage proportional to the workpiece diameter and which is connectable to the indicating means so that the voltage applied by the compensating rheostat to the indicating means is proportional to the workpiece diameter.

Still another important object is realized by the provision of means connected to the said first potentiometer and to the indicating means to calibrate the indicating means to read the calculated speed of the workpiece diameter based on the applied voltage to the armature, and by the provision of means connected to the said second potentiometer and to the indicating means to compensate the indicating means to read zero when the interconnected first and second potentiometers are adjusted for zero workpiece diameter.

An important object is to provide a measuring system of this type that is simple and durable in construction, economical to manufacture and assemble, highly efficient in operation, and which can be utilized by anyone with little or no instruction.

The foregoing and numerous other objects and advantages of the invention will more clearly appear from the following detailed description of a preferred embodiment, particularly when considered in connection with the accompanying drawing, which illustrates a circuit diagram.

In machines incorporating a drive mechanism for moving a car, boom or the like in a linear motion, the tachometer generator can be eliminated. The drive mechanism in these types of machines utilizes a shunt wound D.C. motor. These motors are commonly used with a fixed voltage applied to the field and an adjustable voltage applied to the armature. The formula for speed of a shunt motor is:

$$\text{r.p.m.} = \frac{K \times (E_\text{a} - I_\text{a} R_\text{m})}{\phi}$$

The field flux $\phi$ is substantially constant so that it can be seen that r.p.m. is proportional to $E_\text{a}$, voltage applied to the armature, minus $I_\text{a} R_\text{m}$, which is armature current × resistance of the armature circuit including brushes etc., or $$\text{r.p.m.} \ \alpha E_\text{a} - I_\text{a} R_\text{m}$$

It is very simple to connect a voltmeter across the armature, and this gives a fair indication of speed, when the motor runs idle. But as the load on the motor increases $I_a$ increases and $I_a \times R_m$ becomes a factor which cannot be ignored. The voltmeter will always indicate a higher speed than actual speed and the error of the reading is proportional to $I_a R_m$.

It is possible to place a resistor in series with the armature so that a small portion of the armature current will by-pass this resistor and flow through the meter so as to subtract from the current flowing through the meter in response to the armature current. How much compensating current flows in this manner can be adjusted by means of a compensating rheostat so that the meter will read r.p.m. correctly. This system works very well on machines in instances where the r.p.m. of the motor and the i.p.m. of the linear motion of a workpiece are related so that the meter reads the i.p.m. weld speed directly.

However, when the variable speed motor drives a table on which workpieces of different diameters may be placed, as on the types of positioners mentioned previously, another variable is introduced in that the $$i.p.m. = r.p.m. \times \pi \cdot D$$

The present measuring system utilizing the circuit disclosed in the drawing uses the driving motor as a tachometer generator and enables the voltmeter to indicate the weld speed of a rotated workpiece on a positioner table directly in i.p.m. for any selected workpiece diameter.

In this electrical circuit, a resistor 10, constituting an impedance means, which can be variable, is placed in series with the armature 11 of the shunt wound D.C. motor utilized to rotate the turntable of the welding positioner on which workpieces of different diameters can be attached, the resistor 10 simulating the impedance of the armature 11 including the windings and brushes. A variable voltage is applied to the armature 11 by applying a voltage E to the input of the circuit. A first potentiometer or voltage divider referred to by 12 has its slide coil or resistance element 13 connected across or in parallel with the armature 11. The potentiometer 12 is of a type that can be dialed so that the take-off or the dial slide 14 provides a voltage that is proportional to the diameter of the workpiece. It will be noted that in the example disclosed the dial slide 14 of the potentiometer 12 moves from one end to the other of the potentiometer slide coil 13 to pick off voltages proportional to workpiece diameters from zero diameter to say a 30 inch diameter, for example.

A second potentiometer or voltage divider generally referred to by 15 has its slide coil or resistance element 16 connected across or in parallel with the resistor 10 that is responsive to the armature current and develops a voltage equal to the product of the armature current and the resistance of resistor 10. The dial slide 17 of the potentiometer 15 will provide a second voltage that is responsive to the armature current and is proportional to the diameter of the workpiece. It will be noted that the second voltage supplied by the second potentiometer 15 will be proportional to a zero diameter of the workpiece at one end and to a 30 inch diameter at the opposite end of the slide coil 16.

For reasons which will become apparent upon later description of parts, the dial slides 14 and 17 are coupled together on a common shaft indicated representatively by the broken line 20 so that the dial slides 14 and 17 travel together along their prospective slide coils 13 and 16 so that both reach the indicated zero workpiece diameter end of travel together and so that both reach the maximum workpiece diameter end of travel together. This operative interconnection of the potentiometers 12 and 15 assures that the respective first and second voltages supplied by such potentiometers are proportional at all times to the same workpiece diameter.

A voltmeter 21 constituting an indicating means is operatively connected to the output side of both the first and second potentiometers 12 and 15 so as to be responsive to both the first and second voltages. More particularly, one terminal of the voltmeter 21 is connected to the circuit between the zero work diameter ends of the slide coils 13 and 16 of such potentiometers 12 and 15 respectively. The dial slides 14 and 17 of such potentiometers 12 and 15 respectively are operatively connected to the other terminal of the voltmeter 21.

The dial slide 14 of first potentiometer 12 is operatively connected by circuit line 22 to a dial slide 23 of a calibrating rheostat or variable resistance 24. One end of a slide coil 25 of such calibrating rheostat 24 is operatively connected to the second terminal of voltmeter 21. The calibrating rheostat 24 is used to calibrate the voltmeter 21 to read the calculated speed of a workpiece diameter based on an applied voltage to the armature.

A resistor 26 is placed in the line 22 interconnecting the dial slides 14 and 23 of the first potentiometer 12 and the calibrating rheostat 24 respectively so that there will be some resistance in the circuit when the potentiometer 12 is conditioned for a zero workpiece diameter and if the dial slide 23 of the calibrating rheostat 24 is moved to one end of the slide coil 25 in which all resistance of the slide coil 25 is eliminated from the circuit. The resistor 26 constitutes a safety element. Of course, the resistor 26 can be eliminated without affecting the basic principle of operation of the electrical circuit.

The calibrating rheostat 24 is subject to the first voltage produced by the take-off circuit of the first potentiometer 12 which is proportional to the workpiece diameter, and therefore the voltage applied across the voltmeter 21 upon adjustment of the calibrating rheostat 24 is similarly responsive to this first voltage of the first potentiometer 12 and is proportional to the diameter of the workpiece.

The dial slide 17 of the second potentiometer 15 is operatively connected by circuit line 27 to a dial slide 30 of a compensating rheostat or variable resistance 31. A slide coil 32 of the compensating rheostat 31 has one end operatively connected to the same terminal of voltmeter 21 as is the connected end of the slide coil 25 of the calibrating rheostat 24. The compensating rheostat 31 operatively interconnecting the second potentiometer 15 with the voltmeter 21 is utilized to compensate the voltmeter 21 to read zero when the first and second potentiometers 12 and 15 are simultaneously adjusted for a zero workpiece diameter. The compensating rheostat 31 is responsive to the second voltage at the output of the second potentiometer 15 which is proportional to the workpiece diameter, and, accordingly, the voltage applied to the voltmeter upon adjustment of the compensating rheostat 31 is similarly proportional to the workpiece diameter and compensates for the difference between the voltage applied to the armature and the voltage drop of the armature circuit. This circuitry enables the voltmeter 21 to read the correct speed of the workpiece diameter in i.p.m.

The circuit line 27 interconnecting the dial slide 17 of potentiometer 15 and slide 30 of rheostat 31 is provided with a resistor 33, the purpose of which is to place some resistance in the line for a safety factor when the second potentiometer 15 is dialed to a zero workpiece diameter and when the dial slide 30 of the compensating rheostat 31 is moved completely to one end of its cooperating slide coil 32 in which all resistance of the slide coil 32 is eliminated from the circuit. Of course, the resistor 33 can be eliminated, if desired, without affecting the basic principle and operation of the measuring system.

In order to fully disclose an operable embodiment, specific values will be assigned to the components of the electrical circuit. It will be assumed that the maximum r.p.m. of the positioner table is 4 r.p.m., that the voltage E applied to the armature circuit is 75 volts, that the maximum diameter of the workpiece for which the unit is to be designed is 30 inches diameter, and that the full scale on the voltmeter 21 is to read 100 i.p.m. Under these conditions, the variable resistor 10 is 2 ohms and is set to 1.5 ohms. The first and second potentiometers 12 and 15 are each 7500 ohms. The calibrating rheostat 24 is 25,000 ohms, while the resistor 26 is 2200 ohms. The compensating rheostat 31 is 7500 ohms, while the fixed resistor 33 is 20,000 ohms.

To calibrate the measuring system, the compensating rheostat 31 and calibrating rheostat 24 are set to maximum resistance and the first and second potentiometers 12 and 15 are set to a large diameter setting, while the motor armature 11 is driven at any given set speed that provides a reading on the voltmeter 21. A simple calculation indicates the true i.p.m., utilizing the formula $$\text{i.p.m.} = \text{r.p.m.} \times \pi \cdot D$$

The calibrating rheostat 24 is adjusted so that the voltmeter 21 reads the true, calculated i.p.m.

Then, the first and second potentiometers 12 and 15 are maintained at their original setting set to zero workpiece diameter and the motor speed is reduced. Under these conditions the compensating circuit will be feeding a current through the voltmeter 21 that will cause it to read a higher value of i.p.m. than actual i.p.m. The true i.p.m. is again calculated and the compensating rheostat 31 is adjusted so that the voltmeter 21 will read the true i.p.m. The above procedure is repeated for accuracy. The system is now calibrated and the compensating rheostat 31 and the calibrating rheostat 24 need not be touched again.

It is thought that the operation and functional advantages of this measuring system have become fully apparent from the foregoing detailed description of parts, but for completeness of disclosure, the usage will be briefly described.

It will be assumed that a shunt wound, D.C. motor is utilized to rotate a turntable of a positioner, the turntable being adapted to retain workpieces of different diameters. For purpose of illustration, it will be assumed that a workpiece of a predetermined diameter, say 30 inches, is attached to the turntable of the positioner and it is desired to provide a peripheral weld on this workpiece. The operator dials in the diameter of his weld by adjusting the potentiometers 12 and 15 to read 30 inches. Then, the speed of the drive is adjusted by varying the voltage E applied to the armature circuit until the desired i.p.m. weld speed in i.p.m. is indicated directly on the voltmeter 21. The compensating circuit provided by the second potentiometer 15 feeds a current through the voltmeter 21 in a direction that will compensate for the difference between the voltage applied to the armature 11 and the voltage drop of the armature circuit.

The use of the tandem potentiometers 12 and 15 affect the appropriate proportioning of the compensating voltage so that the drive motor itself can be used as a tachometer generator, thereby reducing the cost of purchased equipment, saving installation time because of fewer components to mount and space saving because of the elimination of a tachometer generator.

Although the invention has been described by making detailed reference to a single preferred embodiment, such detail is to be understood in an instructive, rather than in any restrictive sense, many variants being possible within the scope of the claims hereunto appended.

I claim as my invention:

1. A system for measuring the peripheral speeds of workpieces having different diameters rotated at variable speeds by a motor having an armature subject to a variable voltage to control thte armature speed, comprising:
    (a) an impedance means connected in series with the motor armature to simulate the impedance of the armature,
    (b) a first voltage divider including a resistance element and a coacting slider, the resistance element of the first voltage divider being connected in parallel with the motor armature, the first voltage divider providing a voltage proportional to a workpiece diameter,
    (c) a second voltage divider including a resistance element and a coacting slider, the resistance element of the second voltage divider being connected in parallel with said impedance means, the second voltage divider providing a voltage proportional to the same workpiece diameter, and
    (d) an indicating means having a first input terminal connected between the motor armature and the impedance means, and having a second input terminal connected to both sliders of the voltage dividers.

2. A system for measuring the peripheral speeds of workpieces having different diameters rotated at variable speeds by a motor having an armature subject to a variable voltage to control the armature speed as defined in claim 1, in which:
    (e) means couple the first and second voltage dividers so that the sliders move in unison in order that the pick-off voltages of both voltage dividers are proportional at all times to the same workpiece diameter.

3. A system for measuring the peripheral speeds of workpieces having different diameters rotated at variable speeds by a motor having an armature subject to a variable voltage to control the armature speed as defined in claim 1, in which:
    (e) a first variable resistance is provided having first and second terminals, the first terminal of the first variable resistance being connected to the slider of the first voltage divider,
    (f) a second variable resistance is provided having first and second terminals, the first terminal of the second variable resistance being connected to the slider of the second voltage divider, and
    (g) means connecting the second terminals of both the first and second variable resistances to the second input terminal of the indicating means.

4. A system for measuring the peripheral speeds of workpieces having different diameters rotated at variable speeds by a motor having an armature subject to a variable voltage to control the armature speed as defined in claim 1, in which:
    (e) the resistance elements of the voltage dividers have a common input terminal connected to the first input terminal of the indicating means, and
    (f) means couple the first and second voltage dividers so that the sliders move in unison across the respective resistance elements, the sliders reaching the common terminal end of the resistance elements together and moving away from the common terminal end together in order that the pick-off voltages of both voltage dividers are proportional at all times to the same workpiece diameter.

5. A system for measuring the peripheral speeds of workpieces having different diameters rotated at variable speeds by a motor having an armature subject to a variable voltage to control the armature speed as defined in claim 1, in which:
    (e) the resistance elements of the voltage dividers have a common input terminal connected to the first input terminal of the indicating means,
    (f) means couple the first and second voltage dividers so that the sliders move in unison across the respective resistance elements, the sliders reaching the common terminal end of the resistance elements together and moving away from the common terminal end together in order that the pick-off voltages of both voltage dividers are proportional at all times to the same workpiece diameter,
    (g) a first variable resistance is provided having first and second terminals, the first terminal of the first variable resistance being connected to the slider of the first voltage divider,
    (h) a second variable resistance is provided having first and second terminals, the first terminal of the second variable resistance being connected to the slider of the second voltage divider, and (i) means connect the second terminals of both the first and second variable resistances to the second input terminal of the indicating means.

References Cited

UNITED STATES PATENTS

| | | | |
|---|---|---|---|
| 2,649,572 | 8/1953 | Carlson | 318—331 |
| 2,799,819 | 7/1957 | Brown | 318—331 |
| 2,814,012 | 11/1957 | Swanson | 318—331 |
| 2,841,768 | 7/1958 | Robinson | 324—158 |
| 3,231,808 | 1/1966 | McDaniel | 318—331 |

RUDOLPH V. ROLINEC, *Primary Examiner.*

WALTER L. CARLSON, *Examiner.*

M. J. LYNCH, *Assistant Examiner.*